Oct. 27, 1970 R. B. BELSER ET AL 3,536,409
METHOD OF QUANTITATIVELY EVALUATING SEAM-PUCKER
IN FABRICATED TEXTILES
Filed Feb. 21, 1968 8 Sheets-Sheet 1

INVENTORS
RICHARD B. BELSER
JAMES C. MEADERS
CHIN T. KWON

BY
R. Hoffman
ATTORNEY

FIG. 3

INVENTORS
RICHARD B. BELSER
JAMES C. MEADERS
CHIN T. KWON

BY

*R. Hoffman*
ATTORNEY

FIG. 4

Oct. 27, 1970    R. B. BELSER ET AL    3,536,409
METHOD OF QUANTITATIVELY EVALUATING SEAM-PUCKER
IN FABRICATED TEXTILES
Filed Feb. 21, 1968    8 Sheets-Sheet 5

FIG. 6

INVENTORS
RICHARD B. BELSER
JAMES C. MEADERS
CHIN T. KWON

BY R. Hoffman
ATTORNEY

Oct. 27, 1970 R. B. BELSER ET AL 3,536,409
METHOD OF QUANTITATIVELY EVALUATING SEAM-PUCKER
IN FABRICATED TEXTILES
Filed Feb. 21, 1968 8 Sheets-Sheet 6

FIG. 7

INVENTORS
RICHARD B. BELSER
JAMES C. MEADERS
CHIN T. KWON

BY R. Hoffman

ATTORNEY

United States Patent Office 3,536,409
Patented Oct. 27, 1970

3,536,409
QUANTITATIVELY EVALUATING SEAM-PUCKER IN FABRICATED TEXTILES
Richard B. Belser, James C. Meaders, and Chin T. Kwon, Atlanta, Ga., assignors to the United States of America as represented by the Secretary of Agriculture
Filed Feb. 21, 1968, Ser. No. 707,183
Int. Cl. G01n 21/32
U.S. Cl. 356—238                                        1 Claim

ABSTRACT OF THE DISCLOSURE

Irregularities due to seam pucker are evaluated in fabricated textiles by measuring the reflected light from a moving specimen of such textile and comparing it with the light reflected from a similar area of a flat sample which is used as a standard. These measurements are the basis for adjusting the tension in the textiles in the fabricating machinery to eliminate puckered seams.

---

This invention relates to a means for evaluating seam pucker in fabricated textiles. More specifically, this invention relates to a means for quantitatively evaluating seam pucker in fabricated textiles, utilizing photometric principles. The means comprises the use of known devices in a systematic arrangement to obtain a measurement of pucker during or after fabrication of textiles, such as garments, curtains, and the like.

The main object of this invention is to provide a method for grading seam pucker.

The secondary object of the invention is to provide a device or means of evaluating seam pucker wherein the evaluation would be obtained rapidly enough for necessary corrective action to reduce pucker. For instance, a degree of corrective action can be taken by tensioning adjustments in the seam sewing machinery.

The present invention provides the apparatus and method of obtaining a quantitative evaluation of seam pucker. The method is objective and precise, and the evaluation values that the method yields are repetitive therefore reliable.

The problem of seam pucker has become increasingly significant with the greater use of easy-care fabrics. Where emphasis has been on treatment of textiles to impart wrinkle resistance, now the emphasis has turned to the problems created by the solutions which solved the earlier problems. Although there are many wrinkle resistant treatments for textiles, satisfactory with respect to the specific objective, these treatments have generally introduced other undesirable fabric characteristics. As a result, researchers now dedicate their investigation efforts to the new problem. U.S. Pat. 3,094,705 relates to a method for producing a pucker-free seam in a garment, and cites some of the problems of seam pucker. The instant invention does not deal with a direct attempt to eliminate the problem of seam puckering. It deals with the measurement of the seam puckering. The measurement can be done as the puckering forms or after it has formed along seams.

An obvious extension of the method of this invention would deal with rectifying the physics of distortion as the seam is formed while the machinery is running and introducing the pucker, wheren automatic adjustments of the machinery could eliminate or alleviate the condition causing the pucker of the subsequently produced product; however, this invention does not deal with the problem of adjusting the machinery. The instant invention relates only to the quantitative measurement of the same pucker of fabricated textiles.

There presently exists a single recognized method of evaluating the degree of seam pucker. This is Tentative Test Method 88B-1964T, which appears in detail on page 99B and 100B of the 1964 Technical Manual of the American Association of Textile Chemists and Colorists. This AATCC Method suffers from the subjective judgment of the observer. The puckered seam is evaluated by comparison of its appearance against that of each of 5 existing standards replicated by photographic methods. The evaluation is a visual one, and is subjective. It does not provide a suitable quantitative measurement of the pucker. In vew of the state of the art an objective method of measuring the seam pucker which would be precise and reliable would be a desirable achievement. Now that goal has been achieved. In the process of investigative work related to seam pucker we have invented a method of measuring seam pucker by photometric instrumentation. By this method variations of reflected light have been measured as a fabric surface is either rotated or translated under a collimated light beam. Since puckered specimens exhibit varying degrees of fabric displacement over the surface area of interest the reflection of the light intensity over the seam is scanned to provide an analog output from a photometer, which may be observed with a suitable instrument or recorded, or both.

In general, the instant invention can best be described as a method of quantitatively measuring the degree of seam puckering in a seam comprising:

(a) placing specimen on a specimen table and positioning said specimen a selected distance from an illuminating source so that a selected area can be scanned for puckering, (b) illuminating the positioned selected area with a collimated beam of light so that the said collimated beam of light strikes the specimen at about 90° from horizontal, (c) translating the said positioned specimen by horizontal movement of the specimen table at a continuous and monodirectional rate of speed, (d) measuring the varying quantity of light as it is reflected from the said moving specimen by means of a light sensing device which generates and transmits electrical energy proportioned to the light intensity to a graphic recorder, the said device being securely positioned to receve the reflected light at a selected nonvarying distance, measured from the center of the area where the collimated light beam strikes the specimen to the eye of the sensing device, this path of reflected light to sensing device describing an angle of about 30 degrees from horizontal, (e) graphically recording the quantity of reflected light synchronously with the translating movement of step (c), and (f) computing the deviation from a standard line by either an area or linear measurement to obtain a quantitative valve of seam puckering.

In reducing the present invention to practice these significant parameters were used: (1) the 6-volt light was enclosed above the collimating tube and placed directly above the seam; (2) a series of combinations of fabrics were used wherein chiefly cotton textiles were evaluated, such as printcloth, broadcloth, Oxford, and the like, including chemically treated as well as untreated controls; (3) a recorded amplitude (sensitivity) of 20 millivolts per inch and an equivalent chart speed of 30 inches per minute were suitable; and (4) all tests were conducted in a totally darkened room to eliminate extraneous reflectance.

The measurements cited in the specification all have reference to speciments entirely of white cloth and white sewing thread. In attempting to duplicate these examples corrections should be made for measurements of colored materials.

To speed-up evaluation of the tracings obtained the ratio of the length of a data curve (S) to that of the corresponding length of abcissa ($x_2-x_1$) was used, but the evaluation can be made by measurement of the area between the curve and the established zero line and computing the average deviation from the line by the expression:

$$\frac{\text{area}}{\text{length of base line}} = \text{deviation}$$

A planimeter was used for area calculation by hand but the method was more time consuming than considered desirable. Since the stadimeter appeared to give valid results it was used for the bulk of the work. Where cost of equipment is not a significant factor an automatic integrator and a double-beam differential arrangement to remove fabric variations appear most feasible to recommend.

The described method for grading seam pucker is precise and reliable compared with visual rating methods in the state of the art. The method of this invention provides direct applicability in the sewing and garment manufacturing industry due to its simplicity.

Figure 2:
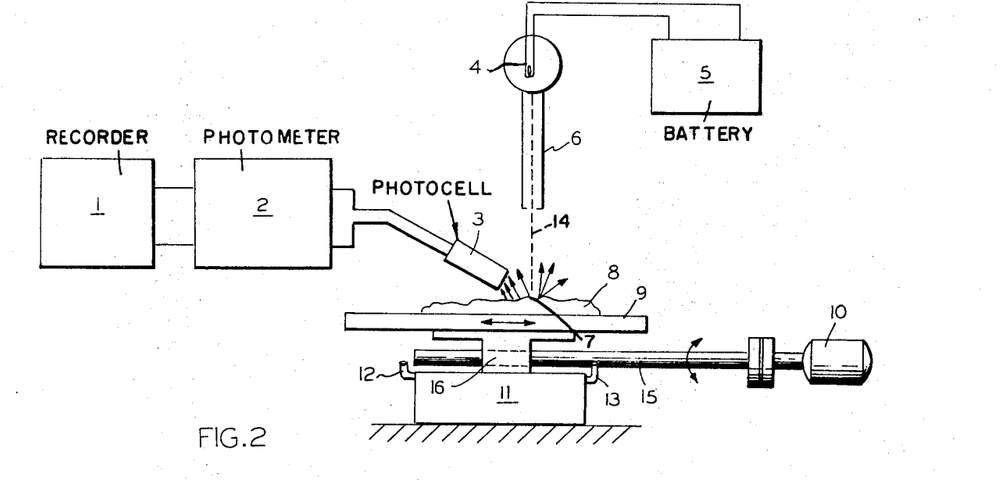

In the following examples a generally chronological sequence of data is presented to illustrate development of the idea, discarding the superfluous. The last group of examples best represents the method of the invention, and in no way should be construed as limiting the invention. The preferred arrangement of the parts of the method are shown in FIG. 2; however, this should not be construed as limiting the invention to that specific arrangement.

EXAMPLE 1

Measurement of seam pucker by rotory scanning method:

The initial apparatus for measurement of seam pucker by the photometric method was arranged as follows: A circular disc of approximately 16 inches diameter was constructed of ¾-inch plywood, and mounted on a pivot so that it could be rotated in horizontal plane about its axis. Its surface was painted black. A white cloth specimen containing a puckered seam was placed on the table with the seam crossing the center of the disc. Black metal masks were prepared with circular holes of 1 inch, 1¼ inch, and 1½ inch diameters, respectively. One of these was then centered over the puckered seam.

A model 574 Weston photronic cell was arranged directly above and facing the cloth sample. A collimater tube with blackened interior was arranged over the face of the cell to extend down to a position about 2 inches above the cloth. A high intensity lamp was set up to illuminate the exposed area with the incident beam striking at an angle of about 45° to the horizontal. The output of the photocell was registered by a mircoammeter and fed through a resistance decade in series with the meter for output of a potential which could be supplied to an X-Y recorder. The disc was then rotated allowing the cloth to rotate about a vertical axis while the output of the photocell was observed or recorded.

Figure 1:
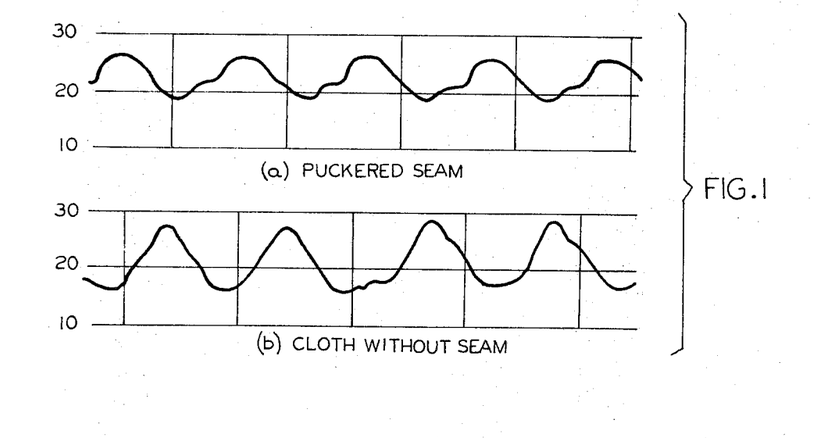

The sensitivity of this particular cell was sufficient to discriminate changes of light intensity during the rotation, but the output of the cell was insufficient to furnish the desired amplitude in the traced curve. A much more sensitive cell (Aminco photomultiplier) was then substituted as the sensor to achieve a satisfactory output amplitude. FIGS. 1-A and 1-B show the traces of the puckered and unpuckered fabric seams, respectively, obtained with the latter sensor. Evaluation of a series of measurement by this method led to the conclusion that the difficulty in interpretation, caused by the rotary geometry needlessly complicated the problem. These four disadvantages of the rotary system were noted:

(a) Centering the seam on the table rotational axis is difficult;
(b) Only a small portion of the seam is examined;
(c) The sewing thread, and the warp and filling directions markedly affect the trace; and
(d) The system is not adaptable to continuous seam monitoring.

EXAMPLE 2

Measurement of seam pucker by translational scanning method:

In the translational method the apparatus was arranged as shown in FIG. 2. The specimen 8 was supported and translated by a motor-driven milling vise 11. A reversible motor 10 attached to the driving screw 15 allowed the carriage 16 of the vise 11 to be driven in either direction at a uniform rate of 9 inches per minute (Note: another rate can be selected. There is no reason for not increasing the traversing speed greatly.), under the collimated light beam 14 incident to the seam specimen 8 at a 90° angle ($<\alpha$). Microswitches 12 and 13 were attached at both ends of the vise bed, and the specimen table 9 was automatically stopped when the carriage 16 of the vise reached either extreme position. A masked 3-inch length of seam to be traced was selected. The tracing was made in the direction in which sewing had been done, and since it was possible to retrace in the opposite or in the same direction, these traces were also made, thereby obtaining a second and third curve of the same area.

In reference to the reversed tace, it should be noted that said trace does not appear the same when the scanning is done in the one direction as when the scanning is done in the opposite direction. The reason being that since the relative positions of pucker would be reversed the relative position of the various peaks of the trace must also be reversed; however, the mathematical ratio (curve length:base line length) is the same.

Recordings were made as the traces were performed, using a time base drive on the abscissa of an X-Y recorder. The recorder used allowed flexible settings of sweep and amplitude. Measurements of several samples at a fixed rate of about 30 inches per minute (recorder speed) indicated that about 9 inches per minute of abscissa length would be recorded during the trace of a 3-inch seam length, with sufficient data peak spread for accurate interpretation. The decision was made to use the translational method wherein the Western 574 photometric apparatus proved of sufficient sensitivity and was used thereafter.

Procedure used to obtain a trace by method of the instant invention

The specimen 8 was placed on the horizontal specimen table 9 and the mask of black painted metal was placed over the seam to be evaluated so that the major axis of the mask was centered over the seam.

The light 4 was turned on, and the collimated beam 14 struck the specimen 8 with the major axis of the illuminated zone (of rectangular shape) perpendicular to the seam line of the sample. The photometer 2 and the recorder 1 were turned on. The motor drive 10 was then switched on, thereby initiating the movement of the specimen in the desired direction. The photometer output was supplied to the ordinate deflection terminals of the recorder and a trace of the intensity was registered as the illuminated zone traversed the seam.

EXAMPLE 3

A battery-operated lamp assembly was positioned so that light bulb 4, 6-volt battery 5, and light beam collimator (blacked on inside) 6, would be directly over the seam to be scanned. With the incident light at 90°, the angle ($<\beta$) at which the reflected light reached the photocell 3 was then varied.

A seam puckered sample (the specimen) was evaluated for puckering by scanning the same area with the reflect light being read by the photometer at four selected positions. The positions selected were where the photocell axis with respect to the horizontal was 30°, 40°, 50°, and 60°. FIG. 2 shows a schematic arrangement which proved suitable. In this arrangement the specimen 8 was moved (translated) horizontally under the fixed focal illuminated zone of the collimated beam of light incident at 7. The photometer, likewise was fixed, and the photocell axis was the imaginary line from the center of the eye of the photocell to the intersection with the imaginary line which would be a perpendicular center line from the center of the light source of the specimen table 9. The angles 30°, 40°, et al. were measured from the photocell axis and in respect to the horizontal, which was the specimen table 9.

Figure 3:
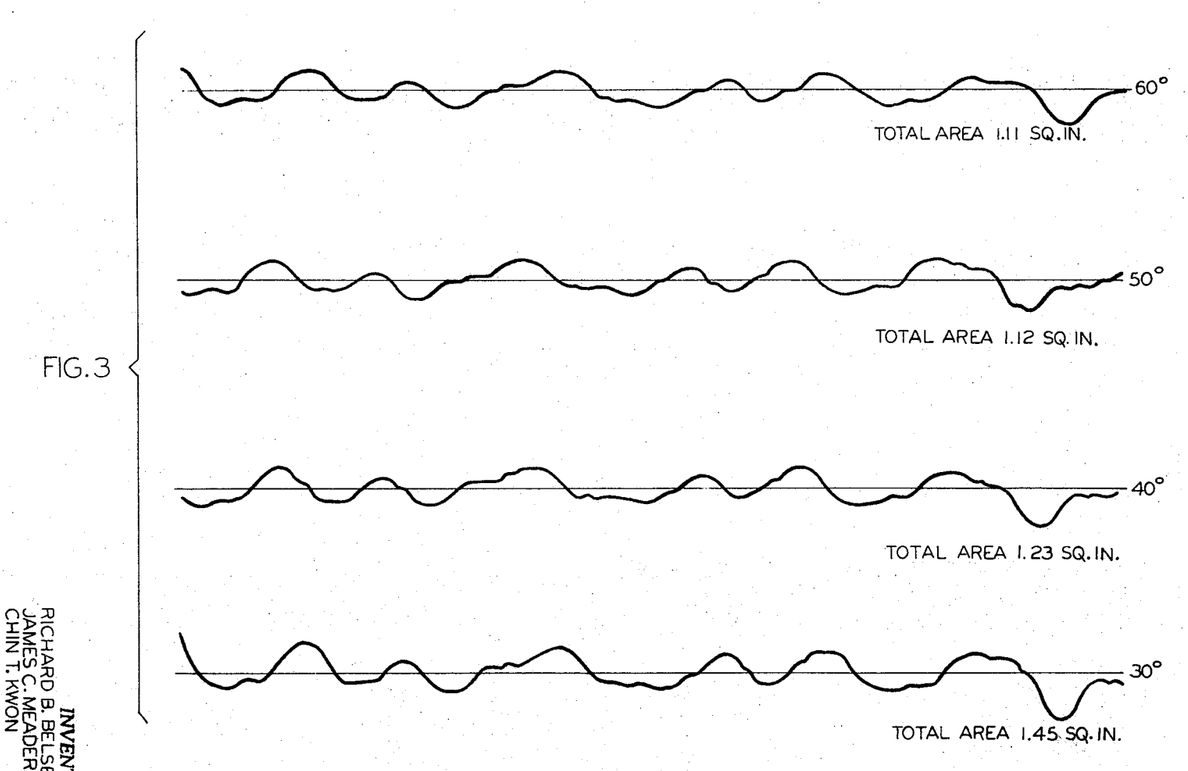

The curves obtained in this analysis of a selected puckered seam specimen are shown in FIG. 3. The straight line in each case represents the theoretical unpuckered intensity. Values above and below this line represent increases and decreases in intensity respectively, in reference to the standard. The areas designated, i.e., for 40° the total area being 1.23 sq. in., are areas between the curve and the line. These computations are readily made using an integrator such as a planimeter.

*Note.*—An automatic integrator can also be used but for this purpose the zero line must be shifted to the bottom tips of the peaks rather than the centerline as shown.

A second method of evaluating the curves obtained is one in which one measures the total length of the curve, and compares this measurement with the length of the straight line (the length of the standard), which in this particular arrangement was about 9 inches. The curves of FIG. 3 were measured for total length with a stadimeter, and computed as a ratio in equation $s/x_n-x_o$ wherein $s$ is the length of the trace and $(x_n-x_o)$ the abscissa zero trace. This method is rapid, the results are satisfactory, and a simple device, such as the stadimeter, can be used to obtain the measurement. For this reason this method was used in the seam pucker computation once the curve was obtained.

Since the arrangement where the photocell axis was at 30° with the horizontal plane gave the largest variations in amplitude of the ordinate displacement on the plot this angle for the photometer axis was selected to be used in the sequent measurements.

Figure 4:
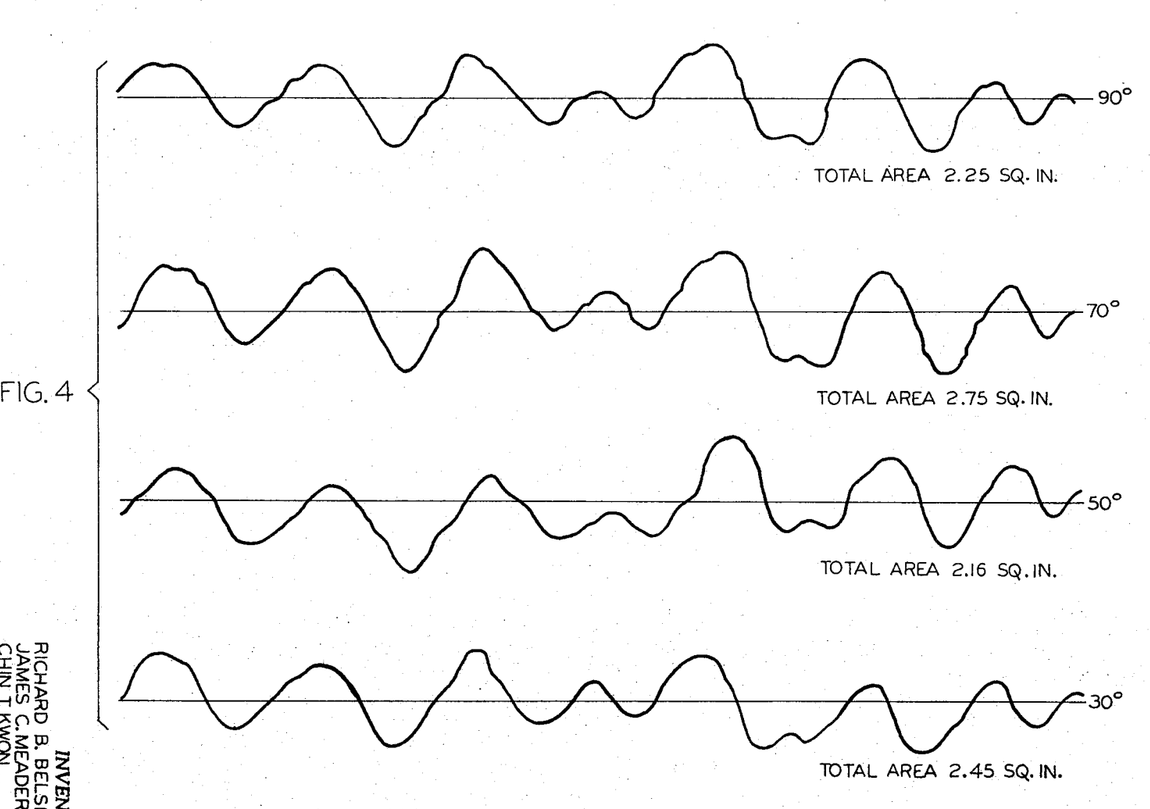

The photometer axis was maintained at 30° while the position of the collimated light beam was next varied through a selected series of angles (90°, 70°, 50°, and 30° from the horizontal with the photocell and light collimator arranged essentially 180° apart about the vertical axis through the illuminated zone). FIG. 4 shows the curves obtained. From evaluation of these results it was concluded that there is no significant difference in varying the position of the light source, so the 90° position was selected as most convenient for the operator.

EXAMPLE 4

Figure 5:
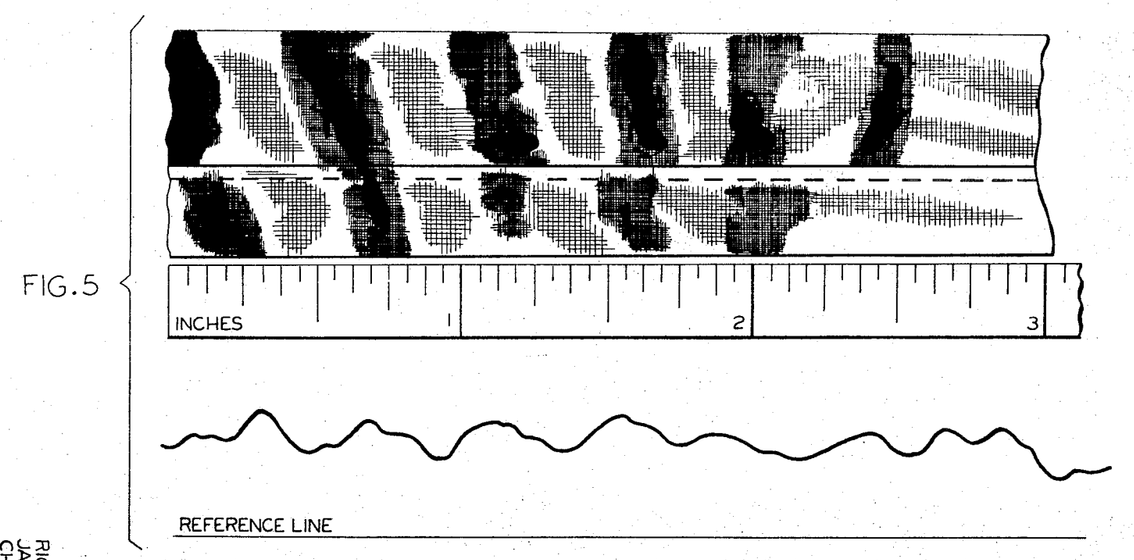
Figure 6:
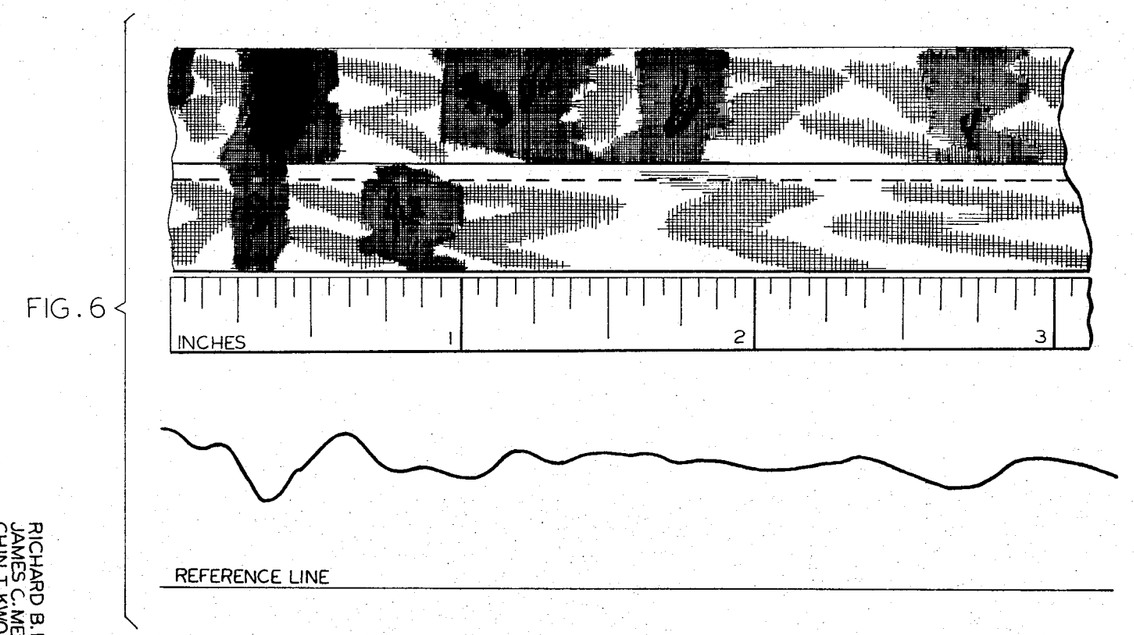
Figure 7:
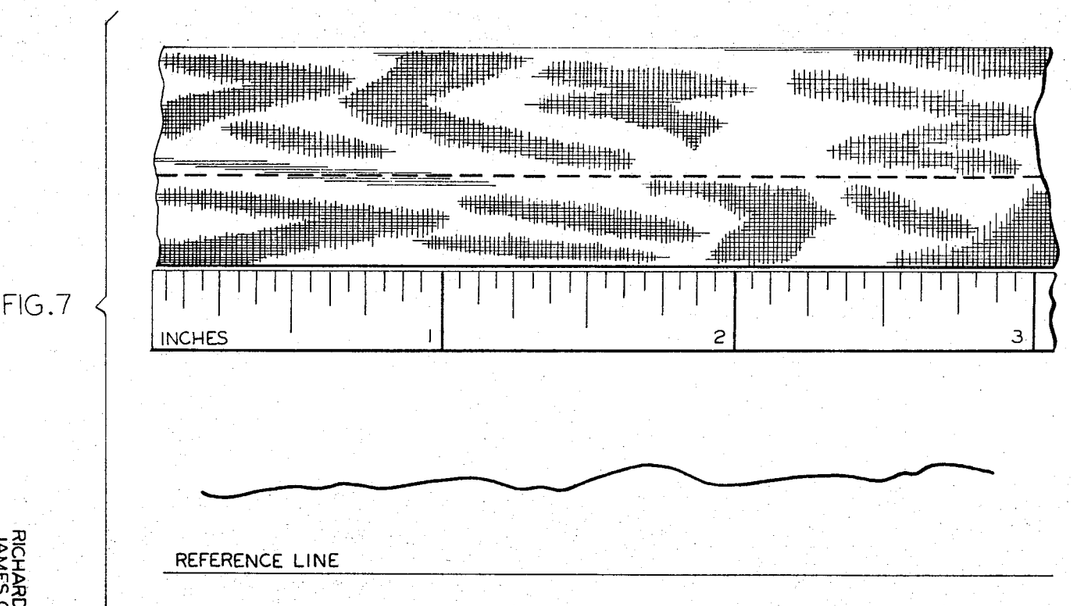

Having determined the most suitable apparatus arrangement in Example 3, three seams were selected for comparative studies of the measurement method of this invention against the selected seams which were judged "poor," "good," and "excellent" by the AATCC standards. FIGS. 5, 6, and 7, respectively, show the photomicrographs of these three seams. Photoproductions of the respective photomeric traces of the seams for comparison purposes are shown at the base of each figure.

EXAMPLE 5

Figure 8:
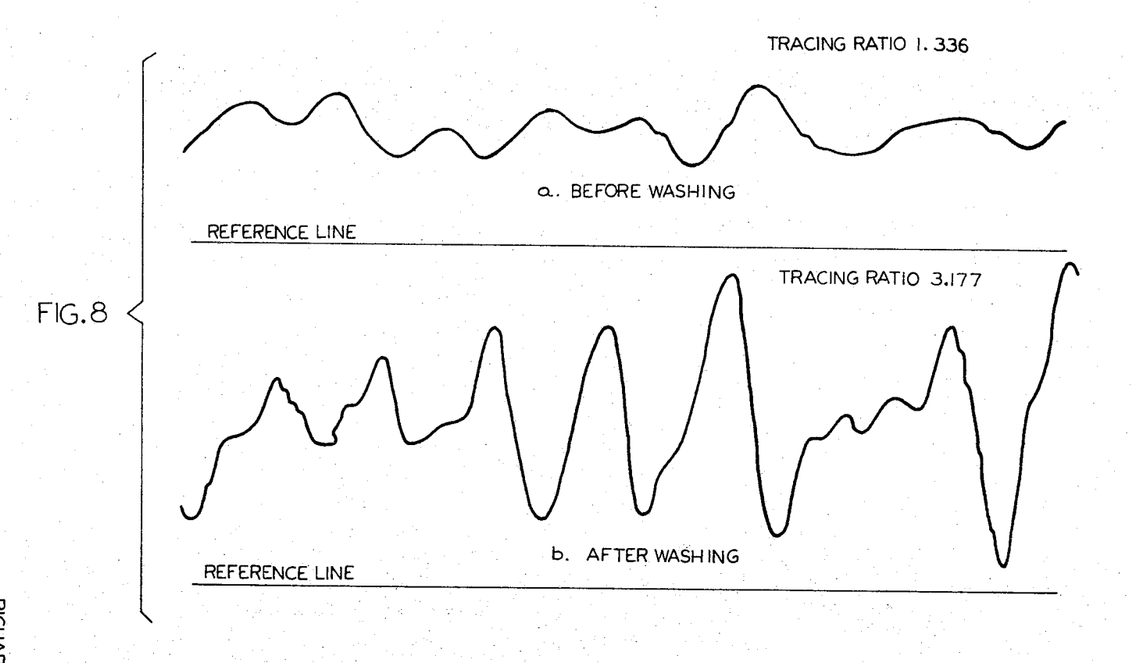

To continue the line of investigation of Example 4 a seam which was judged as "excellent" by AATCC standards was submitted to a standard washing, and allowed to dry. FIG. 8 shows the seam judged as before and after it was washed. The degree of puckering has been greatly increased and the degree of resolution possible with the method of the instant invention is clearly exhibited.

EXAMPLE 6

Figure 9:
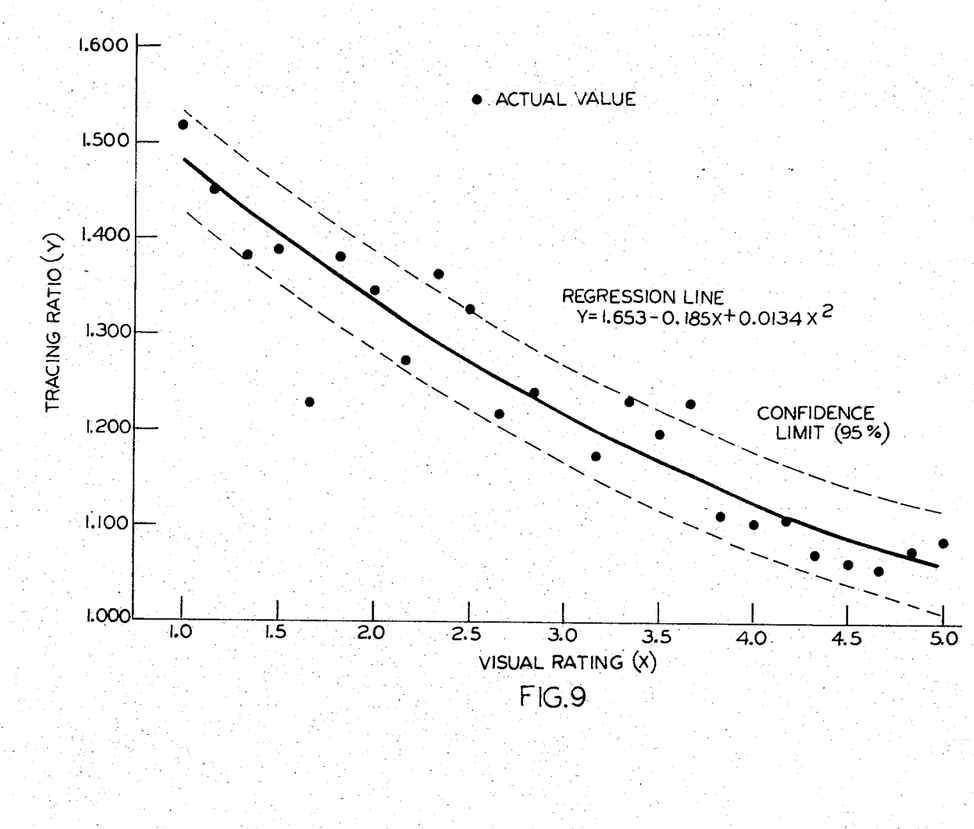

In correlating the evaluation of seams against AATCC Tentative Test Method 88B–1964T, five hundred fifty-three samples were traced and the ratio of the length of the curve, measured by a stadimeter, to that of the length of the straight line, $s/x_n-x_o$, was calculated for each specimen. The average of visual ratings by three individuals for each specimen was also determined. Using these two different evaluation methods of seam pucker a comparison was made between them, and the relationship of the new grading systems was statistically determined. FIG. 9 exhibits the relationship between the visual ratings and the tracings. This regression line is expressed in the formula:

$$Y = 1.653 - 0.185x + 0.0134X^2$$

where

X = visually rated class and

Y = tracing ration $(a/x_n-x_o)$

The index of correlation of values obtained between the AATCC visually rated class and the tracing values of this invention is 0.89. It should be obvious to those skilled in the art that the correlation is good. It is a high correlation considering the inaccuracy of visual rating. See FIG. 9 for a graphic study of these values.

The photometric tracing method which is the method of this invention can be tabulated against the visual rating class of AATCC standards using the precise lighting, fabrics, and amplitudes employed in the following manner.

| Rating class: | Estimated tracing ratio |
| --- | --- |
| 1 | >1.522 |
| 2 | 1.443:1.522 |
| 1 | >1.522 |
| 1 | 1.443:1.522 |
| 1–2 | 1.370:1.443 |
| 2–3 | 1.246:1.305 |
| 3 | 1.193:1.246 |
| 3–4 | 1.148:1.193 |
| 4 | 1.109:1.148 |
| 4–5 | 1.077:1.109 |
| 5 | <1.077 |

Similar calibrations may be performed for other apparatus, fabrics, or arrangements. A double beam differential arrangement would allow subtraction of fabric variables and essentially indicate only the pucker variable. The addition of a suitable integrator (or a pulse height analyzer) would allow immediate analysis of the pucker effect as it occurs and the introduction of necessary corrective action as previously suggested.

We claim:
1. A method of quantitively measuring degree of seam puckering comprising:
   (a) placing specimen on a specimen table and positioning said specimen a selected distance from an illuminating source so that a selected area can be scanned for puckering,
   (b) illuminating the positioned selected area with a collimated beam of light so that the said collimated beam of light strikes the specimen at about 90° from horizontal,
   (c) translating the said positioned specimen by horizontal movement of the specimen table at a continuous and mono-directional rate of speed,
   (d) measuring the varying quantity of light as it is reflected from the said moving specimen by means of a light sensing device which generates and transmits electrical energy proportioned to the light in- tensity received by it to a graphic recorder, the said device being securely positioned to receive the reflected light at a selected nonvarying distance, measured from the center of the area where the collimated light beam strikes the specimen to the eye of the sensing device, this path of reflected light to sensing device, this path of reflected light to sensing device describing an angle of about 30 degrees from horizontal, (e) graphically recording the quantity of reflected light synchronously with the translating movement of step (c), and (f) computing the deviation from a standard line by either an area or linear measurement to obtain a quantitative value of seam puckering.

References Cited

UNITED STATES PATENTS 3,388,261   6/1968   Roberts et al. ____ 356—238 XV

FOREIGN PATENTS 1,400,080   4/1965   France.

RONALD L. WILBERT, Primary Examiner

O. B. PHEW, II, Assistant Examiner

U.S. Cl. X.R.

250—219